(12) United States Patent
Choudary et al.

(10) Patent No.: US 6,812,186 B2
(45) Date of Patent: Nov. 2, 2004

(54) PREPARATION OF NEW LAYERED DOUBLE HYDROXIDES EXCHANGED WITH DIISOPROPYLAMIDE FOR C-C BOND FORMING REACTIONS

(75) Inventors: Boyapati Manoranjan Choudary, Andhra Pradesh (IN); Aduri Ravindra, Andhra Pradesh (IN); Mannepalli Lakshmi Kantam, Andhra Pradesh (IN); Chinta Reddy Venkat Reddy, Andhra Pradesh (IN); Balagam Bharathi, Andhra Pradesh (IN)

(73) Assignee: Council of Industrial Research, New Delhi (IN)

( * ) Notice: Subject to any disclaimer, the term of this patent is extended or adjusted under 35 U.S.C. 154(b) by 296 days.

(21) Appl. No.: 10/106,807

(22) Filed: Mar. 27, 2002

(65) Prior Publication Data

US 2003/0191014 A1 Oct. 9, 2003

(51) Int. Cl.$^7$ ............................. B01J 31/18; B01J 31/26
(52) U.S. Cl. ...................... 502/150; 502/152; 502/162; 502/167
(58) Field of Search ................................ 502/150, 162, 502/152, 167

Primary Examiner—Robert D. Harlan
(74) Attorney, Agent, or Firm—Nath & Associates PLLC; Harold L. Novick

(57) ABSTRACT

The present invention relates to design and preparation of LDH-diisopropylamide through simple exchange process for the first time and its use in catalytic amounts for preparing aldols/α,β-unsaturated nitriles/α,β-unsaturated esters/transesterified products/β-nitroalkanols/Michael adducts and epoxide, resulting in higher yields.

20 Claims, No Drawings

PREPARATION OF NEW LAYERED DOUBLE HYDROXIDES EXCHANGED WITH DIISOPROPYLAMIDE FOR C-C BOND FORMING REACTIONS

FIELD OF THE INVENTION

The present invention relates to preparation of layered double hydroxides exchanged with diisopropylamide (LDH-diisopropylamide) useful as recyclable catalysts for preparing aldols/α,β-unsaturated nitriles/α,β-unsaturated esters/transesterified products/β-nitroalkanols/Michael adducts and epoxides. More particularly the present invention relates to preparation of layered double hydroxides exchanged with diisopropylamide of the formula $[M^{I}$ and/or $M^{II}_{(1-x)}M^{III}_{x}(OH)_2][NCH(CH_3)_2^-]_{x/2} \cdot zH_2O$ wherein $M^{I}$ is a monovalent cation ($Li^+$, $Na^+$, $K^+$, $Rb^+$ or $Cs^+$), $M^{II}$ is a divalent cation ($Mg^{2+}$, $Mn^{2+}Fe^{2+}$, $Co^{2+}$, $Ni^{2+}$, $Cu^{2+}$, $Zn^{2+}$ or $Ca^{2+}$); $M^{III}$ is a trivalent ion ($Al^{3+}$, $Cr^{3+}$, $Mn^{3+}$, $Fe^{3+}$, $Co^{3+}$, $Ni^{3+}$, or $La^{3+}$); x has a value ranging between 0.10 to 0.50 and more preferably 0.20 to 0.33; z is an integer whose values depends on the ingredients and reactions conditions used and methods of preparation and use thereof. The LDH-diisopropylamides of this invention are recyclable catalysts for preparing aldols/α,β-unsaturated nitriles/α,β-unsaturated esters/transesterified products/β-nitroalkanols/Michael adducts and epoxides.

This invention particularly relates to an eco-friendly process employing recyclable LDH-diisopropylamide as an heterogeneous catalyst in place of soluble bases for preparing aldols/α,β-unsaturated nitriles/α,β-unsaturated esters/transesterified products/β-nitroalkanols/Michael adducts and epoxides by reacting with corresponding aldehydes with acetone (Aldol condensation), aldehydes with activated nitriles or esters (Knoevenagel condensation), alcohols with β-keto or simple esters (transesterification), aldehydes with nitro alkanes (Henry reaction), activated methylenes with α,β-unsaturated compounds (Michael addition), epoxidation of olefins. The obtained products are important intermediates for the preparations of drugs, pharmaceuticals, perfumes, cosmetics, oils, paint and fine chemicals. For example the products of benzylidene derivatives prepared by Knoevenagel condensation are used to inhibit tyrosine proteinase kinase, fine chemicals such as styrene oxide, 1-decene oxide, 1-octene oxide, 1-hexene oxide, cyclohexene oxide, cyclopentene oxide, epoxy chalcones by epoxidation of olefins, can be obtained by this method.

There are serious disadvantages in performing the reactions such as Aldol, Knoevenagel condensation, transesterification, Henry reaction, Michael addition and epoxidation of olefins with homogeneous system in the manufacture of aldols/α,β-unsaturated nitrites/α,β-unsaturated esters/transesterified products/β-nitroalkanols/Michael adducts and epoxides due to presence of toxic wastes remnants of neutralization of soluble base with acid at the end of the reaction, lack of reusability and selectivity, tedious work-up procedure, higher temperatures and longer reaction times. By employing the heterogeneous catalytic system, the cost naturally comes down due to easy recovery and recyclability of the catalyst for number of recycles and very insignificant loss of active species, when compared with homogenous system. The products thus obtained using heterogeneous catalyst system are benign in the sense that the presence of minor impurities due to side reactions is also precluded.

BACKGROUND AND PRIOR ART REFERENCES

Reference may be made to US patent U.S. Pat. No. 4,458,026 wherein aldol condensation of acetone is carried out by heat-treated synthetic anionic clay. The inherent disadvantages in this process are higher temperatures and longer reaction times with lower yields.

Reference may be made to Choudary et al., Chem. Commun., 1998, 1033 wherein aldol condensation of acetone is carried out by rehydrated hydrotalcite. The inherent disadvantages in this process are higher temperatures, longer reaction times and lack of selectivity.

Reference may be made to Choudary et al., Tetrahedron. Lett., 1998, 3555 wherein aldol condensation of acetone is carried out by Mg—Al—O-t-Bu hydrotalcite. The inherent disadvantage in this process is the catalyst is more sensitive to moisture and shelf life is short.

Reference may be made to J. Otera Chem. Rev., 1993, 93, 1449 wherein transesterification of alcohols are reviewed detailing many procedures under homogeneous and heterogeneous routes. The inherent disadvantages in these processes are higher temperatures, longer reaction times, and lack of selectivity and reusability.

Reference may be made to US patent U.S. Pat. No. 5,350,879 wherein transesterification of alcohols is carried by calcined hydrotalcites in heterogeneous way. The drawback of this process is the reaction is carried at higher temperature.

Reference may be made to Choudary et al., J. Mol. Catal., 2000, 159, 411 wherein transesterification is carried out by Mg—Al—O-t-Bu hydrotalcite. The inherent disadvantage in this process is the catalyst is more sensitive to moisture and shelf life is short.

Reference may be made to Choudary et al., Tetrahedron. 2000, 56, 9357 wherein Knoevenagel condensation and Michael addition is carried out by Mg—Al—O-t-Bu hydrotalcite. The inherent disadvantage in this process is the catalyst is more sensitive to moisture and shelf life is short.

Reference may be made to Choudary et al., Synlett., 1998, 1203 wherein epoxidation of olefins is carried out by Mg—Al—O-t-Bu hydrotalcite. The inherent disadvantage in this process is the catalyst is more sensitive to moisture and shelf life is short.

Reference may be made to Choudary et al., J. Mol. Catal., 1999, 146, 279 wherein Michael addition is carried out by Mg—Al rehydrated hydrotalcite. The inherent disadvantages in this process are low yields, longer reaction times and require activation for each catalytic cycle for reuse.

Reference may be made to Choudary et al., Green. Chem., 1999, 187 wherein Henry reaction is carried out by Mg—Al rehydrated hydrotalcite. The inherent disadvantages in this process are low yields, longer reaction times and require activation for each catalytic cycle to reuse.

OBJECTS OF THE INVENTION

The main object of the present invention is to prepare a heterogeneous recyclable LDH-diisopropylamide and use in catalytic amounts for preparing aldols/α,β-unsaturated nitrites/α,β-unsaturated esters/transesterified products/β-nitroalkanols/Michael adducts and epoxides which obviates the drawbacks as detailed above.

Another object of the present invention is that LDH as synthesized having interstitial anions such as chloride, nitrate, carbonate, sulfate or calcination of LDH having the said interstitial anions at temperatures in the range of 350 to 550° C. is used as precursors for the preparation of LDH-diisopropylamide.

Still another object of the present invention is to recover the heterogeneous LDH-diisopropylamide used in C—C bond forming reactions comprising Aldol, Knoevenagel. Michael, etc, transesterification and epoxidation by simple filtration and reuse for number of cycles with consistent activity and selectivity.

Still another object of the present invention is the quantity of LDH-diisopropylamide used in the reaction contains 1 to 10 mol % of diisopropylamide with respect to the substrate.

SUMMARY OF THE INVENTION

The novelty of the present invention lies in the design and preparation of LDH-diisopropylamide through simple exchange process for the first time and its use in catalytic amounts for preparing aldols/α,β-unsaturated nitriles/α,β-unsaturated esters/transesterified products/β-nitroalkanols/ Michael adducts and epoxides. Higher yields were obtained when LDH-diisopropylamide catalysts are used in the C—C bond forming epoxidation, and transesterification reactions in organic solvents. The products obtained by various methods are important intermediates for the preparation of drugs, pharmaceuticals, perfumes, cosmetics, oils, paints and fine chemicals. The consistent activity for several cycles in C—C bond formation reactions makes the processes economical and possible for commercial realisation. Therefore, LDH-diisopropylamide is better option for the synthesis of aldols/ α,β-unsaturated nitrites/α,β-unsaturated esters/ transesterified products/β-nitroalkanols/Michael adducts and epoxides. Thus this invention offers the best techno-economic route for the synthesis of intermediates in the preparation of drugs, pharmaceuticals and fine chemicals. The use of different metals and in varied compositions used in the preparation of LDH support has showed little impact on its final form of LDH-diisopropylamide with respect to activity.

DETAILED DESCRIPTION OF THE INVENTION

Accordingly, the present invention states LDH-diisopropylamide useful as a catalyst having the formula $[M^I$ and/or $M^{II}_{(1-x)}M^{III}_x(OH)_2][NCH(CH_3)_2]_{x/2}.zH_2O$ wherein $M^I$ is a monovalent cation selected from the group consisting of Li, Na, K, Rb, Cs, $M^{II}$ is a divalent cation selected from the group consisting of $Mg^{2+}$, $Mn^{2+}$, $Fe^{2+}$, $Co^{2+}$, $Ni^{2+}$, $Cu^{2+}$, $Zn^{2+}$ $V^{2+}$, $Cr^{2+}$, or $Ca^{2+}$ and $M^{III}$ is a trivalent ion selected from the group consisting of $Al^{3+}$, $Cr^{3+}$, $Mn^{3+}$, $V^{3+}$, $Fe^{3+}$, $Co^{3+}$, $Ru^{3+}$, $Rh^{3+}$, $Ga^{3+}$, $In^{3+}$, or $La^{3+}$; x has a value ranging between 0.10 to 0.50 and more preferably 0.20 to 0.33; z is an integer whose values depends on the ingredients and reactions conditions used. The new LDH-diisopropylamide catalysts of this invention are reused in the preparation aldols/α,β-unsaturated nitriles/α,β-unsaturated esters trans-esterified products/β-nitroalkanols/Michael adducts and epoxides.

In an embodiment of the present invention, a process for the preparation of the catalyst LDH-diisopropylamide of the formula $[M^I$ and/or $M^{II}_{(1-x)}M^{III}_x(OH)_2][NCH(CH_3)_2]_{x/2}.zH_2O$ wherein the said process comprises reacting lithium diisopropylamide of formula $LiNCH(CH_3)_2$ with a LDH of formula $[M^I$ and/or $M^{II}_{(1-x)}M^{III}_x(OH)_2][A^{n-}]_{x/n}.zH_2O$ wherein x has a value ranging between 0.10 to 0.50 and more preferably 0.20 to 0.33; z is an integer whose values depends on the ingredients and reactions conditions used; $A^{n-}$ is an anion selected from nitrate, carbonate, sulphate or chloride; $M^I$ is a monovalent cation selected from the group consisting of Li, Na, K, Rb, Cs, $M^{II}$ is a divalent cation selected from the group consisting of $Mg^{2+}$, $Mn^{2+}$, $Fe^{2+}$, $Co^{2+}$, $Ni^{2+}$, $Cu^{2+}$, $Zn^{2+}$ $V^{2+}$, $Cr^{2+}$, or $Ca^{2+}$ and $M^{III}$ is a trivalent ion selected from the group consisting $Al^{3+}$, $Cr^{3+}$, $Mn^{3+}$, $V^{3+}$, $Fe^{3+}$, $Co^{3+}$, $Ru^{3+}$, $Rh^{3+}$, $Ga^{3+}$, $In^{3+}$, or $La^{3+}$ in an organic solvent selected from the group consisting of organic solvents selected from group consisting of methanol, ethanol, isopropanol, 1-propanol, 1-butanol, 2-butanol and tert-butyl alcohol, acetonitrile, tetrahydrofuran, dichloromethane, dichloroethane at a temperature ranging between 20 to 30° C. for a period of 5 to 24 h under the nitrogen atmosphere followed by filtration to obtain the desired catalyst.

In an embodiment of the present invention, a method for the preparation of aldols/(α,β-unsaturated nitriles/α,β-unsaturated esters/transesterified products/β-nitroalkanols/ Michael adducts and epoxides using the recyclable catalyst LDH-diisopropylamide of the formula $[M^I$ and/or $M^{II}_{(1-x)}M^{III}_x(OH)_2][NCH(CH_3)_2^-]_{x/2}.zH_2O$ wherein $M^I$ is a monovalent cation (Li, Na, K, Rb, Cs), $M^{II}$ is a divalent cation ($Mg^{2+}$, $Mn^{2+}$, $Fe^{2+}$, $Co^{2+}$, $Ni^{2+}$, $Cu^{2+}$, $Zn^{2+}$ $V^{2+}$, $Cr^{2+}$, or $Ca^{2+}$); $M^{III}$ is a trivalent ion ($Al^{3+}$, $Cr^{3+}$, $Mn^{3+}$, $V^{3+}$, $Fe^{3+}$, $Co^{3+}$, $Ru^{3+}$, $Rh^{3+}$, $Ga^{3+}$, $In^{3+}$, or $La^{3+}$) as recyclable catalysts for Aldol condensation (aldehydes with acetone), Knoevenagel condensation (aldehydes with activated nitriles or esters), transesterification (alcohols with β-keto or simple esters), Henry reaction (aldehydes with nitro alkanes), Michael addition (activated methylenes with α,β-unsaturated compounds), epoxidation of olefins in a solvent selected from acetone, methanol, ethanol, dichloromethane, chloroform, 1-propanol, 2-propanol, toluene, nitromethane, acetonitrile and/or t-butanol at a temperature in the range of 10 to 120° C. for a period 0.15 to 24 h, and obtaining the pure product by conventional method.

In an embodiment of the present invention, a catalyst having the diisopropylamide contents ranges between 1 to 30% of diisopropylamide.

In an embodiment of the present invention, LDH as synthesized having interstitial anions such as chloride, nitrate, carbonate, sulfate or calcination of LDH having the said interstitial anions at temperatures in the range of 350 to 550° C. is used as precursors for the preparation of LDH-diisopropylamide.

In an embodiment of the present invention, the quantity of LDH-diisopropylamide used in the reactions contains 0.01 to 15 mol % of diisopropylamide content with respect to the substrate.

In an embodiment of the present invention, LDH-diisopropylamide is reused for several cycles with consistent activity.

In another embodiment of the present invention, the solvent selected is acetone, methanol, ethanol, dichloromethane, chloroform, 1-propanol, 2-propanol, toluene, nitromethane, acetonitrile and/or t-butanol, etc.

In still another embodiment of the present invention, the reaction is, preferably, effected at a known temperature, in the range of 10 to 120° C. for a period of 0.15 to 24 h.

In still another embodiment of the present invention, the products formed by various methods are important intermediates for the preparations of drugs, pharmaceuticals, perfumes, cosmetics, oils, paints and fine chemicals. For example the products of benzylidene derivatives prepared by Knoevenagel condensation are used to inhibit tyrosine proteinase kinase, fine chemicals such as styrene oxide, 1-decene oxide, 1-octene oxide, 1-hexene oxide, cyclohexene oxide, cyclopentene oxide, epoxy chalcones by epoxidation of olefins, can be obtained by this method.

Scientific Explanation

In the present invention, we prepared LDH-diisopropylamide for the first time and used in catalytic amounts for the preparation of aldols/α,β-unsaturated nitriles/α,β-unsaturated esters/transesterified products/β-nitroalkanols/Michael adducts and epoxides in a heterogeneous way.

LDH-diisopropylamide is prepared by anion exchange method from the LDH containing chloride, nitrate anions or their calcined forms. The diisopropylamide anions in LDH are responsible for the Aldol and Knoevenagel condensations, transesterification, Henry reactions, Michael addition and epoxidation reactions. The activity of LDH-diisopropylamide is similar or higher than the homogeneous counter parts. The higher activity is ascribed to the support effect. The basic LDH-NCH($CH_3$)$_2$ induces abstraction of proton from the active methylene group to trigger C—C coupling in epoxidation and transesterification reactions.

Higher yields are obtained with LDH-diisopropylamide catalysts and the products are important intermediates for the preparation of drugs and pharmaceuticals, this invention is timely and appropriate. Therefore, LDH-diisopropylamide is a better option. The LDH-diisopropylamide catalysts prepared by various metals showed little variation in the catalytic activity. Albeit, all the metals used in the preparation of LDH offered good to excellent yields. Thus this invention offers the best techno-economic route for the preparation of intermediates of drugs, pharmaceuticals, perfumes, cosmetics, oils, paints and fine chemicals.

LDH-diisopropylamides are prepared as exemplified and used in catalytic amounts for preparing aldols/α,β-unsaturated nitrites/α,β-unsaturated esters/transesterified products/β-nitroalkanols/Michael adducts and epoxides in a heterogeneous way as described in the examples.

The following examples are given by way of illustration of the present invention and therefore should not be construed to limit the scope of the invention.

Preparation of Layered Double Hydroxides

EXAMPLE 1
Preparation of $Mg^{2+}/Al^{3+}/NO_3^-$-LDH (Ia)

The $Mg^{2+}/Al^{3+}/NO_3$_ LDH with a Mg/Al ratio of 3:1 was prepared from magnesium nitrate hexahydrate (30.8 g, 0.12 mol) and aluminum nitrate nonahydrate (15.0 g, 0.04 mol) which were dissolved in 100 ml of deionised and decarbonated water. The pH of the solution was adjusted to ~10 by the addition of NaOH (2M). The slurry was stirred for 2 h at room temperature under nitrogen atmosphere and then filtered under nitrogen atmosphere, washed thoroughly and dried under vacuum at 80° C.

EXAMPLE 2
Preparation of Calcined $Mg^{2+}/Al^{3+-}$-LDH (Ib)

The $Mg^{2+}/Al^{3+}/NO_3^-$ LDH with a Mg/Al ratio of 3:1 was prepared from magnesium nitrate hexahydrate (30.8 g, 0.12 mol) and aluminum nitrate nonahydrate (15.0 g, 0.04 mol) which were dissolved in 100 ml of deionised and decarbonated water. The pH of the solution was adjusted to ~10 by the addition of NaOH (2M). The slurry was stirred for 2 h at room temperature under nitrogen atmosphere and then filtered under nitrogen atmosphere, washed thoroughly and dried under vacuum at 80° C. The solid was then dried and calcined at 450° C. for 6 h in airflow.

EXAMPLE 3
Preparation of $Mg^{2+}/Al^{3+}/Cl^-$-LDH (Ic)

A mixture of $MgCl_2.6H_2O$ (30.49 g. 0.15 mol) and $AlCl_3.6H_2O$ (12.07 g. 0.05 mol) was dissolved in 200 mL of deionised water. The resultant aqueous solution was slowly added at 25° C. to 100 mL of NaOH solution at pH 10 while stirring under a nitrogen flow. The pH of the reaction mixture was maintained constantly (~10) by the continuous addition of 2 M NaOH. The suspension thus obtained was stirred overnight under a nitrogen atmosphere at 70° C. The solid product was isolated by filtration, washed thoroughly with deionised water, and dried overnight at 80° C. Decarbonated water was used in all the synthetic steps. $Mg^{2+}/Al^{3+}/Cl^-$ hydrotalcites of the different Mg/Al ratios were also prepared similarly, using appropriate amounts of magnesium chloride hexahydrate and aluminium chloride hexahydrate.

EXAMPLE 4
Preparation of $Mg^{2+}/A^{3+}/Cl^-$-LDH (Id)

A mixture of $MgCl_2.6H_2O$ (30.49 g. 0.15 mol) and $AlCl_3.6H_2O$ (12.07 g. 0.05 mol) was dissolved in 200 mL of deionised water. The resultant aqueous solution was slowly added at 25° C. to 100 mL of NaOH solution at pH 10 while stirring under a nitrogen flow. The pH of the reaction mixture was maintained constantly (~10) by the continuous addition of 2 M NaOH. The suspension thus obtained was stirred overnight under a nitrogen atmosphere at 70° C. The solid product was isolated by filtration, washed thoroughly with deionised water, and dried overnight at 80° C. Decarbonated water was used in all the synthetic steps. $Mg^{2+}/Al^{3+}/Cl^-$ hydrotalcites of the different Mg/Al ratios were also prepared similarly, using appropriate amounts of magnesium chloride hexahydrate and aluminium chloride hexahydrate. The solid was then dried and calcined at 450° C. for 6 h in airflow.

EXAMPLE 5
Preparation of $Mg^{2+}/Al^{3+}/CO_3^{2-}$-LDH (Calcined, Ie)

A mixture of 60.09 g of $Mg(NO_3)_2.6H_2O$ (0.234 mol) and 29.31 g of $Al(NO_3)_3.9H_2O$ (0.078 mol) in 70 ml distilled water was added to a solution of 28.12 g, 50% aq. NaOH (0.703 mol) and 22.08 g $Na_2CO_3$ (0.41 mol) in 100 ml distilled water. The addition was carried out slowly in a 500 ml flask equipped with a mechanical stirrer and the resultant heavy slurry was heated at 65±5° C. for about 18 h. The slurry was allowed to cool to room temperature, filtered and washed. The solid was then dried and calcined at 450° C. for 6 h in airflow.

EXAMPLE 6
Preparation of $Ni^{2+}/Al^{3+}/Cl^-$-LDH (If)

A mixture of $NiCl_2.6H_2O$ (35.65 g. 0.15 mol) and $AlCl_3.6H_2O$ (12.07 g. 0.05 mol) was dissolved in 200 mL of deionised water. The aqueous solution was slowly added at 25° C. to 100 mL of NaOH solution at pH 10 while stirring under a nitrogen flow. The pH was constantly maintained (~10) by the continuous addition of 2 M NaOH. The suspension was stirred overnight under a nitrogen atmosphere at 70° C. The solid product was isolated by filtration, washed thoroughly with deionised water, and dried overnight at 80° C. All synthetic steps were carried out using decarbonated water.

EXAMPLE 7
Preparation of $Li^+/A^{3+}/Cl^-$-LDH (Ig)

The $Li^+/Al^{3+}/Cl^-$ LDH with a Li/Al ratio of 1:2 was prepared as follows. Aluminum nitrate nonahydrate (12.07 g, 0.05 mol) was dissolved in 100 ml of 2M (8.0 g) NaOH. Lithium nitrate (1.025 g, 0.025 moles in 100 ml) was dissolved in this solution, and mixture heated for 48 hours at 90° C. The product was washed with deionised and decarbonated water followed by 0.1M sodium chloride solution and the resultant solid was dried at 80° C. for 5 h. Care was taken to exclude the $CO_2$ during the synthesis.

EXAMPLE 8
Preparation of Calcined Li$^+$/Al$^{3+}$-LDH (Ih)

The Li$^+$/Al$^{3+}$/Cl$^-$ LDH with a Li/Al ratio of 1:2 was prepared as follows. Aluminum nitrate nonahydrate (12.07 g, 0.05 mol) was dissolved in 100 ml of 2M (8.0 g) NaOH. Lithium nitrate (1.025 g, 0.025 moles in 100 ml) was dissolved in this solution, and mixture was heated for 48 hours at 90° C. The product was washed with deionised and decarbonated water followed by 0.1M sodium chloride solution and the resultant solid was dried at 80° C. for 5 h. Care was taken to exclude the CO$_2$ during the synthesis. The solid was calcined at 450° C. for 6 h in airflow.

Preparation of LDH-diisopropylamide

EXAMPLE 9
Preparation of (Mg—Al)LDH-NCH(CH$_3$)$_2$$^-$ (IIa) from Mg$^{2+}$/Al$^{3+}$/NO$_3$$^-$-LDH(Ia)

1.214 g of Ia was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 10
Preparation of (Mg—Al)LDH-NCH(CH$_3$)$_2$$^-$ (IIb) from Calcined Mg$^{2+}$/Al$^{3+-}$-LDH (Ib)

1.214 g of Ib was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 11
Preparation of (Mg—Al)LDH-NCH(CH$_3$)$_2$$^-$ (IIc) from Mg$^{2+}$/Al$^{3+}$/Cl$^-$-LDH (Ic)

1.214 g of Ic was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 12
Preparation of (Mg—Al)LDH-NCH(CH$_3$)$_2$$^-$ (IId) from Mg$^{2+}$/Al$^{3+}$/Cl$^-$-LDH (Id)

1.214 g of Id was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 13
Preparation of (Mg—Al)LDH-NCH(CH$_3$)$_2$$^-$ (IIe) from Mg$^{2+}$/Al$^{3+}$/CO$_3$$^{2-}$-LDH (Calcined, Ie)

1.214 g of Ie was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 14
Preparation of (Ni—Al)LDH-NCH(CH$_3$)$_2$$^-$ (IIf) Ni$^{2+}$/Al$^{3+}$/Cl$^-$-LDH (If)

1.214 g of If was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 15
Preparation of (Li—Al)LDH-NCH(CH$_3$)$_2$$^-$ (IIg) from Li$^+$/Al$^{3+}$/Cl$^-$-LDH (Ig)

1.214 g of Ig was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

EXAMPLE 16
Preparation of (Li—Al)LDH-NCH(CH$_3$)$_2$$^-$ (IIh) from Calcined Li$^+$/Al$^{3+}$-LDH (Ih)

1.214 g of Ih was suspended in 100 ml of 10 mmol (1.0713 g) solution of lithium diisopropyl amide in dry THF and stirred at 25° C. for 24 h under N$_2$ atmosphere. The solid product is filtered, washed with dry THF (250 ml) and vacuum dried. Chemical analysis showed that the product contains 11% of diisoproylamide. This means that 1.1 mmol of diisoproylamide per 1 gram of the product.

C—C Bond Forming Reactions

The C—C bond forming reactions were performed using LDH-NCH(CH$_3$)$_2$ catalysts to evaluate of the present invention.

EXAMPLE 17
Aldol Reaction Between Benzaldehyde and Acetone Catalyzed by LDH-NCH(CH$_3$)$_2$ (IIa)

A two-necked flask was charged with 0.2 ml (2 mmol) of benzaldehyde, 50 mg of catalyst IIa, 5 ml of acetone and the contents were stirred at room temperature. After completion of the reaction (followed by TLC), the catalyst was filtered off and washed with acetone (2×5 ml). The filtrate was concentrated under reduced pressure. The product thus obtained was purified by column chromatography to afford the corresponding aldol in 95% yield.

EXAMPLE 18
Aldol Reaction Between 4-nitrobenzaldehyde and Acetone catalyzed by LDH-NCH(CH$_3$)$_2$ Catalyst (IIa)

A two-necked flask was charged with 0.24 g (2 mmol) of 4-nitrobenzaldehyde, 50 mg of catalyst IIa, 5 ml of acetone and the contents were stirred at room temperature. After completion of the reaction (followed by TLC), the catalyst was filtered off and washed with acetone (2×5 ml). The filtrate was concentrated under reduced pressure. The product thus obtained was purified by column chromatography to afford the corresponding aldol in 93% yield.

TABLE 1

Aldol condensation between 4-nitrobenzaldehyde and acetone catalysed by various Mg—Al—NCH(CH$_3$)$_2$ hydrotalcite catalysts and reusability experiments[a]

| Ex. No | Catalyst | Time(min) | Yield[b] |
|---|---|---|---|
| 18 | LDH—NCH(CH$_3$)$_2$-(IIa) | 30 | 93 |
| 19 | LDH—NCH(CH$_3$)$_2$-(IIb) | 30 | 95 |
| 20 | Recycle 1 | 30 | 95 |
| 21 | Recycle 2 | 30 | 94 |
| 22 | Recycle 3 | 30 | 94 |
| 23 | Recycle 4 | 30 | 94 |
| 24 | Recycle 5 | 30 | 94 |
| 25 | LDH—NCH(CH$_3$)$_2$-(IIc) | 40 | 94 |
| 26 | LDH—NCH(CH$_3$)$_2$-(IId) | 40 | 94 |
| 27 | LDH—NCH(CH$_3$)$_2$-(IIe) | 40 | 93 |
| 28 | LDH—NCH(CH$_3$)$_2$-(IIf) | 40 | 91 |
| 29 | LDH—NCH(CH$_3$)$_2$-(IIg) | 15 | 95 |
| 30 | LDH—NCH(CH$_3$)$_2$-(IIh) | 15 | 95 |

[a]Reaction conditions as exemplified in example 18.
[b]Isolated yields.

EXAMPLE 19

Aldol Reaction Between 4-nitrobenzaldehyde and Acetone Catalysed by LDH-NCH(CH$_3$)$_2$ Catalyst (IIb): Recycle Experiment.

A two-necked flask was charged with 0.24 g (2 mmol) of 4-nitrobenzaldehyde, 50 mg of used catalyst IIb of example 15, 5 ml of acetone and the contents were stirred at room temperature. After the completion of reaction, the catalyst was allowed to settle and the supernatant solution was pumped out from the reaction flask. The catalyst was washed with dry acetone four times (4×5 mL), allowed to settle and the supernatant acetone solution on each wash was pumped out. Fresh quantities of 4-nitrobenzaldehyde and acetone were introduced. The catalyst was thus recycled for six cycles with consistent activity and selectivity. The filtrate was concentrated under reduced pressure. The product thus obtained was purified by column chromatography to afford the corresponding aldol in 95% yield.

EXAMPLES 20–24

For recycle experiments the procedure was followed as in example 19 and the results are presented in Table 1.

EXAMPLES 25–30

The procedure was followed as in example 18 with various catalysts IIc–IIh and the results are presented in Table 1.

EXAMPLES 31–36

Aldol Reaction Between Substituted Benzaldehydes and Acetone Catalysed by LDH-NCH(CH$_3$)$_2$ Catalyst (IIb)

The procedure was followed as in example 18 and the results are given in Table 2.

1. Aldol Condensation

Scheme-1

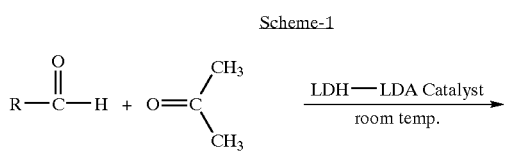

-continued

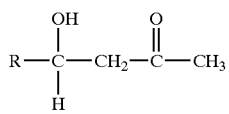

R = Aryl

TABLE 2

Aldol condensations catalysed by LDH—NCH(CH$_3$)$_2$ catalyst (IIb)[a]

| Ex. No | R | Time (min) | Conversion (%) | Isolated Yields (%) |
|---|---|---|---|---|
| 31 | 3-NO$_2$-Phenyl | 30 | 100 | 97 |
| 32 | 4-MeO-Phenyl | 40 | 90 | 88 |
| 33 | 2-MeO-Phenyl | 30 | 100 | 93 |
| 34 | 3-MeO-Phenyl | 30 | 100 | 97 |
| 35 | 3,4,5-MeO-Phenyl | 30 | 100 | 92 |
| 36 | 4-Cl-Phenyl | 45 | 100 | 93 |

[a]Reaction conditions as exemplified in Example 18

Knoevenagel Condensation

Knoevenagel condensation reactions involving various aromatic aldehydes compounds with (a) malononitrile and (b) ethyl cyanoacetate (Scheme 2) as the active methylene compounds were carried out with LDH-NCH(CH$_3$)$_2$ catalyst (IIb) at room temperature (Table 3).

Scheme-2

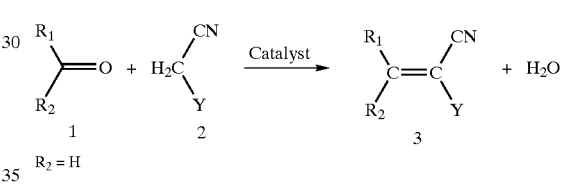

R$_2$ = H

EXAMPLE 37

General Procedure for Knoevenagel Condensation.

Aldehyde (2 mmol) and 0.05 g of Mg—Al—NCH(CH$_3$)$_2$ LDH (IIb) were stirred in 5 ml of dimethylformamide for 5 min. Then the active methylene compound (2 mmol) was added and stirring was continued till the completion of the reaction, as monitored by thin layer chromatography (TLC). The catalyst was filtered and the product was extracted with ethyl acetate, dried over anhydrous sodium sulfate and concentrated under reduced pressure. The crude product was purified by column chromatography.

TABLE 3

Knoevenagel condensation catalysed by LDH—NCH(CH$_3$)$_2$ catalyst (IIb)[a]

| Ex. No | R$_1$ (1) | Y (2) | Time | Isolated Yields (3) (%) |
|---|---|---|---|---|
| 38 | C$_6$H$_5$ | CN | 0.5 h | 98 |
| 39 | C$_6$H$_5$ | CO$_2$Et | 2.0 h | 95 |
| 40 | 4-OMeC$_6$H$_4$ | CN | 0.5 h | 70 |
| 41 | 4-OMeC$_6$H$_4$ | CO$_2$Et | 1.5 h | 60 |
| 42 | 4-Cl C$_6$H$_4$ | CN | 0.5 h | 98 |
| 43 | 4-Cl C$_6$H$_4$ | CO$_2$Et | 0.5 h | 90 |
| 44 | 2-furyl | CN | 15 min | 98 |
| 45 | 2-furyl | CO$_2$Et | 0.5 h | 98 |
| 46 | 4-NO$_2$ C$_6$H$_4$ | CN | 0.5 h | 98 |
| 47 | 4-NO$_2$ C$_6$H$_4$ | CO$_2$Et | 0.5 h | 98 |
| 48 | 2-OMeC$_6$H$_4$ | CN | 15 min | 98 |
| 49 | 2-OMeC$_6$H$_4$ | CO$_2$Et | 15 min | 98 |

[a]Reaction conditions as exemplified in Example 37.

EXAMPLES 38–49

The procedure was followed as in example 37 and the results are given in Table 3.

Henry Reactions

Henry reactions involving various aromatic aldehydes compounds with nitromethane (Scheme 3) as the active methylene compound is carried out with LDH-NCH(CH$_3$)$_2$ catalyst (IIb) at room temperature (Table 4).

Scheme-3

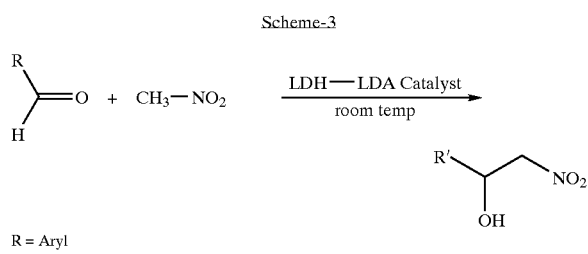

R = Aryl

EXAMPLE 50
General Procedure for Henry Reactions

To a mixture of nitroalkane (10 mmol) and benzaldehyde (2 mmol), 0.03 g of catalyst (IIb) was added at room temperature and stirred till completion of the reaction, as monitored by TLC. The catalyst was filtered and washed with dichloromethane (10 ml×3). Then, the filtrate was concentrated under reduced pressure.

EXAMPLES 51–57

The procedure was followed as in example 50 and the results are given in Table 4.

TABLE 4

Henry reactions between nitromethane and various aldehydes catalysed by LDH—NCH(CH$_3$)$_2$ catalyst (IIb)[a]

| Ex. No | R | Time (h) | Yields (%)[b] |
| --- | --- | --- | --- |
| 51 | C$_6$H$_5$ | 1.0 | 98 |
| 52 | 2-Furyl | 1.0 | 98 |
| 53 | p-NO$_2$C$_6$H$_4$ | 0.5 | 98 |
| 54 | (CH$_3$)$_2$CH$_2$— | 1.0 | 95 |
| 55 | o-MeOC$_6$H$_4$ | 0.5 | 98 |
| 56 | m-NO$_2$C$_6$H$_4$ | 0.5 | 98 |
| 57 | p-BrC$_6$H$_4$ | 0.5 | 98 |

[a]Reaction conditions as exemplified in Example 50.
[b]Determined by $^1$H NMR, based on aldehyde.

Transesterification

Scheme-4

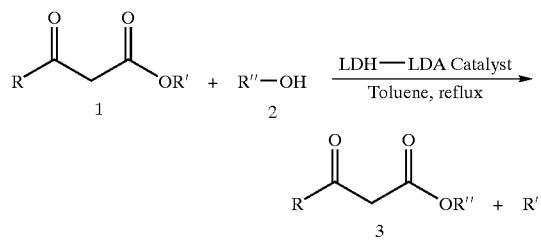

EXAMPLE 58
General Procedure for Transesterification Reactions

In a two-necked round bottomed flask, (1 mmol) of ester, (1 mmol) of alcohol and 25 mg of catalyst (IIb) in 10 ml dry toluene were stirred at 90–100° C. and reaction was monitored by thin layer chromatography (TLC). Work-up comprises of simple filtration followed by evaporation under reduced pressure and purified by column chromatography (hexane/ethylacetate, 95/5, v/v) to afford the product. The product was analysed by NMR, IR and Mass spectra, which were in accordance with those obtained by literature procedures.

TABLE 5

Transesterification reactions catalysed by LDH—NCH(CH$_3$)$_2$ catalyst (IIb)[a]

| Ex. No | Ester (1) | Alcohol (2) | Time (h) | Yield (3)[b] |
| --- | --- | --- | --- | --- |
| 59 | Methyl acetoacetate | Cinnmyl alcohol | 5.0 | 93 |
| 60 | Ethyl acetoacetate | 1-Pentanol | 5.0 | 95 |
| 61 | Ethyl acetoacetate | 1-Decanol | 5.0 | 81 |
| 62 | Methyl acetoacetate | 1-Decanol | 5.0 | 81 |
| 63 | Ethyl acetoacetate | 1-Octonol | 5.0 | 85 |
| 64 | Methyl acetoacetate | 1-Octonol | 5.0 | 85 |
| 65 | Methyl acetoacetate | Propargyl alcohol | 5.0 | 92 |
| 66 | Ethyl acetoacetate | Benzyl alcohol | 5.0 | 88 |
| 67 | Ethyl acetoacetate | Phenol | 2.5 | 60 |

[a]Reaction conditions as exemplified in Example 58.
[b]Isolated Yields

EXAMPLES 59–67

The procedure was followed as in example 58 and the results are given in Table 5.

Epoxidation of Olefins

Incorporation of diisopropylamide in the interlayers of LDH by anion-exchange provided a simple methodology for the preparation of Mg—Al—NCH(CH$_3$)$_2$ LDH. In the present endeavor, we describe a magnificent display of superactivity in the epoxidation of unfunctionalised as well as electron deficient olefins employing IIb and hydrogen peroxide as an oxidant under a set of different conditions as described in Scheme 5 and 6.

Scheme-5

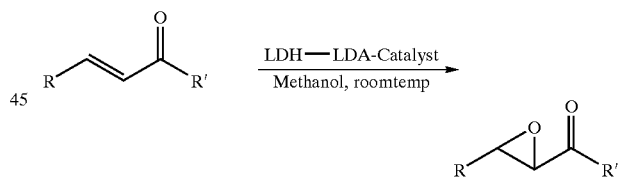

EXAMPLE 68
General Procedure for the Epoxidation of Functionalised Olefins 1 mmol of enone and 0.03 g of catalyst (IIb) were taken in 10 ml of methanol in a 50 ml two-necked round bottom flask. To this solution, 0.35 ml (3 mmol) of aqueous hydrogen peroxide (30% w/w) was added slowly at room temperature under continuous stirring. The reaction was monitored by thin layered chromatography (TLC) till the completion of reaction. After the completion, the solid was separated by filtration and washed with diethyl ether. The solution was evaporated and the residuum is re-dissolved in methylene choride, the solution is then dried over sodium sulfate, the solvent was eliminated under reduced pressure and subjected to a silica gel chromatography using a mixture of n-hexane-EtOAc (40:1, v/v) as an eluent to afford pure product.

TABLE 6

The epoxidation of electron deficient alkenes catalysed by LDH—NCH(CH$_3$)$_2$ catalyst (IIb)[a]

| Ex. No | Substrate | Time (min) | Product | Yields (%)[b] |
|---|---|---|---|---|
| 69 | 1,3-Diphenyl-2-propenone | 50 | trans-1,3-Diphenyl-2,3-epoxypropane-1-one | 98 |
| 70 | 1-Phenyl-3-(4-methylphenyl)-2-propenone | 50 | 1-Phenyl-3-(4-methylphenyl)-2,3-epoxypropane-1-one | 98 |
| 71 | 1-Phenyl-3-(4-methoxyphenyl)-2-propenone | 45 | 1-Phenyl-3-(4-methoxyphenyl)-2,3-epoxypropane-1-one | 95 |
| 72 | 1-Phenyl-3-(4-chlorophenyl)-2-propenone | 55 | 1-Phenyl-3-(4-chlorophenyl)-2,3-epoxypropane-1-one | 98 |
| 73 | 1-Phenyl-3-(4-nitrophenyl)-2-propenone | 55 | 1-Phenyl-3-(4-nitrophenyl)-2,3-epoxypropane-1-one | 98 |
| 74 | Cyclohexenone | 55 | Cyclohexenone oxide | 95 |

[a]Reaction conditions as exemplified in Example 68.
[b]Isolated yields

EXAMPLES 69–74

The procedure was followed as in example 68 and the results are given in Table 6.

Scheme-6

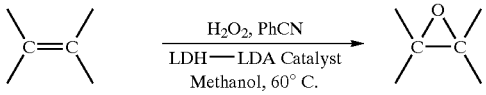

EXAMPLE 75

General Procedure for the Epoxidation of Unfunctionalised Olefins

Into a round-bottomed flask with a reflux condenser were successively placed 0.03 g of catalyst (IIb), 10 ml of methanol, 4 mmol of alkene, 1.0 ml of benzonitrile (10.5 mmol) and 2.4 ml of 30% hydrogen peroxide. The resulting mixture was stirred at 60° C. and monitored by thin layered chromatography. After the completion of reaction, the hydrotalcite was separated by filtration and filtrate was treated with MnO$_2$ (0.03 g) to decompose the remaining H$_2$O$_2$. The filtrate was diluted with deionized water (20 ml) and extracted with CHCl$_3$ (20 ml×3). The extract was concentrated under reduced pressure and subjected to a silica gel chromatography using a mixture of n-Hexane-EtOAc (40:1, v/v) as a eluant to afford the pure product.

TABLE 7

The epoxidation of various unfunctionalised olefins catalysed by LDH—NCH(CH$_3$)$_2$ catalyst (IIb)[a]

| Ex. No | Substrate | Time (h) | Product | Yield (%)[b] |
|---|---|---|---|---|
| 76 | Styrene | 2.0 | Phenyl oxirane | 98 |
| 77 | 1,2 Dihydro naphthalene | 1.5 | 1,2-Epoxy-1,2,3,4-tetrahydro naphthalene | 83 |
| 78 | Cyclohexene | 2.0 | Cyclohexene oxide | 90 |
| 79 | trans-Stilbene | 1.5 | trans-Stilbene oxide | 98 |
| 80 | 1-Decene | 1.5 | 1-Decene oxide | 90 |
| 81 | 1-Hexene | 1.5 | 1-Hexene oxide | 91 |
| 82 | 1-Octene | 1.5 | 1-Octene oxide | 90 |

[a]Reaction conditions as exemplified in Example 75.
[a]Isolated yields

EXAMPLES 76–82

The procedure was followed as in example 75 and the results are given in Table 7.

Michael Addition

The selective 1, 4 addition (Michael reaction) on acceptors (1) (α,β-unsaturated compound) e.g. simple or substituted chalcones and cyclohexanone by donors (2) (active methelene compound) such as nitromethane, diethylmalonate and diethylmalonate catalysed by LDH-NCH(CH$_3$)$_2$ catalyst (IIb).

Scheme-7

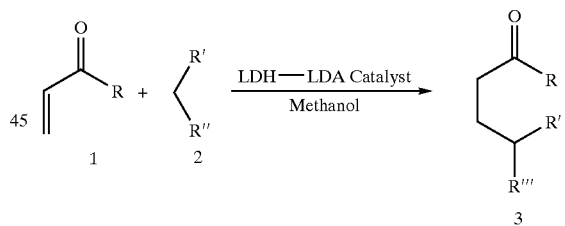

EXAMPLE 83

General Procedure for Michael Reaction

Acceptor (2 mmol) and 0.05 g of LDH-NCH(CH$_3$)$_2$ catalyst (IIb)were stirred in 10 ml of methanol for 5 min., then donor (2 mmol) was added and stirring was continued until the completion of the reaction which was monitored by thin layer chromatography (TLC). The catalyst was filtered and the filtrate was concentrated under reduced pressure. The crude product was purified by column chromatography (Acme Synthetic Chemicals, 60–120 mesh, silica gel using ethyl acetate/hexane). The products were well characterized by $^1$H NMR, Mass and IR spectrometry.

EXAMPLES 84–90

The procedure was followed as in example 83 and the results are given in Table 8.

TABLE 8

Michael Addition Catalysed by LDH—NCH(CH$_3$)$_2$ catalyst (IIb)[a]

| Ex. No | Acceptor (1) | Donor (2) | Product (3) | Time [h] | Yield[b] (%) |
|---|---|---|---|---|---|
| 84 | 1,3-Diphenyl-2-propenone | Nitromethane | 4-Nitro-1,3-diphenyl-1-butanone | 24 | 98 |
| 85 | 1,3-Diphenyl-2-propenone | Dimethyl malonate | Dimethyl-2-(3-oxo-1,3-diphenylpropyl)malonate | 7.0 | 98 |
| 86[c] | 1,3-Diphenyl-2-propenone | Diethyl malonate | Diethyl-2-(3-oxo-1,3-diphenylpropyl)malonate | 1.0 | 98 |
| 87 | 1,3-Diphenyl-2-propenone | Ethyl acetoacetate | Ethyl 2-acetyl-5-oxo-3,5-diphenyl pentanoate | 8.0 | 88 |
| 88 | Cyclopentenone | Dimethyl malonate | 3-Bis(methoxycarbonyl)methyl] cyclopentanone | 24 | 98 |
| 89 | 1-Phenyl-3-(4-methoxyphenyl)-2-propenone | Dimethyl malonate | Dimethyl-2-[1-(4-methoxyphenyl) 3-oxo-3-phenylpropyl] malonate | 24 | 98 |
| 90 | 1-Phenyl-3-(4-methylphenyl)-2-propenone | Dimethyl malonate | Dimethyl-2-[1-(4-methylphenyl) 3-oxo-3-phenylpropyl] malonate | 24 | 98 |

[a]Reaction conditions as exemplified in Example 83.
[b]Isolated Yield,
[c]n-Hexane used as solvent.

The main advantages of the present invention are

1. A novel and ecofriendly process for C—C bond forming reactions is presented.
2. The present process dispenses the use of soluble bases, or lithiumdiisopropylamide instead a heterogeneous reusable LDH-diisopropylamide is used.
3. LDH-diisopropylamide is prepared and used for C—C bond forming reactions under heterogeneous catalysis. The use of heterogeneous LDH-diisopropylamide precludes the presence of by-products.
4. The process is accomplished in a short time to afford high productivity.
5. The work-up procedure is simple.
6. The catalyst is subjected to many recycles, which displayed consistent activity and selectivity.
7. The present process is environmentally safe since there is no disposal problem.
8. The process is economical.

What is claimed is:

1. A process for the preparation of layered double hydroxide exchanged with diisopropylamide catalyst of formula (1) which is referred to as LDH-diisopropylamide catalyst and represented herein below:

[M$^I$ and/or M$^{II}$(1-x)M$^{III}$(x)(OH)$_2$][NCH(CH$_3$)$_2^-$]x/2·/zH$_2$O.

wherein M$^I$ is a monovalent cation

M$^{II}$ is a bivalent cation

M$^{III}$ is a trivalent cation x=0.10 to 0.50 z is an integer whose value depends on the ingredients and the reaction conditions used, the said process comprising steps of:

(a) reacting layered double hydroxide of general formula (2) [M$^I$ and/or M$^{II}$(1-x)M$^{III}$(x)(OH)$_2$][A$^{n-}$]x/2.zH$_2$O with lithium diisopropylamide in an organic solvent under an inert atmosphere of nitrogen at a temperature ranging between 20°–30° C. for a period of 5 to 24 hours, and (b) filtering the reaction mixture of step (a) to obtain the required layered double hydroxide exchanged with diisopropylamide catalyst of general formula (1), referred to as LDH-diisopropylamide cartalyst.

2. A process as claimed in claim 1 wherein the monovalent cation is selected from a group consisting of lithium (Li$^+$), sodium (Na$^+$), potassium (K$^+$), rubium (Rb$^+$) or cesium (Cs$^+$).

3. A process as claimed in claim 1 wherein the bivalent cation is selected from a group consisting of magnesium (Mg$^{2+}$), manganese (Mn$^{2+}$), iron (Fe$^{+2}$), cobalt (Co$^{2+}$), nickel (Ni$^{2+}$), copper (Cu$^{2+}$), zinc (Zn$^{2+}$), vanadium (V$^{2+}$), chromium (Cr$^{2+}$) or calcium (Ca$^{2+}$).

4. A process as claimed in claim 1 wherein the trivalent cation is selected from a group consisting of aluminum (Al$^{3+}$), chromium (Cr$^{3+}$), manganese (Mn$^{3+}$), vanadium (V$^{3+}$), iron (Fe$^{3+}$), cobalt (Co$^{3+}$), ruthenium (Ru$^{3+}$), rhodium (Rh$^{3+}$), gallium (Ga$^{3+}$), indium (In$^{3+}$) or lanthanum (La$^{3+}$).

5. A process as claimed in claim 1 wherein in step (a), the organic solvent used isselected from a group consisting of methanol, ethanol, isopropenol, 1-propanol, 1-butanol, 2-butanol, t-butanol, acetonitrile, tetrahydrofuran, dichloromethane or dichloroethane.

6. A process as claimed in claim 1 wherein in step (a), the layered double hydroxide of general formula (2) contains interstitial anion represented by [A$^{n-}$], which is selected from a group consisting of chloride, nitrate, carbonate or sulphate.

7. A process as claimed in claim 1 wherein in step (a), the layered double hydroxide is used as such or after calcination in the temperature range between 350°–550° C.

8. A process as claimed in claim 1 wherein in step (a), nitrogen gas used provides an inert atmosphere.

9. A process as claimed in claim 1 wherein the value of x ranges between 0.1 to 0.5 and more preferably 0.20 to 0.33.

10. A process as claimed in claim 1, wherein in step (b) the said catalyst LDH-diisopropylamide has diisopropylamide content ranging between 5 to 30%.

11. A process as claimed in claim 1 wherein the LDH-disopropylamide catalyst can be recycled.

12. A process as claimed in claim 1 wherein the said catalyst LDH-diisopropylamide is used in the preparation of aldols, a, b-unsaturated nitriles, a, b-unsaturated esters, transesterified products, b-nitroalkanols, Michael addition products and epoxides.

13. A process as claimed in claim 12 wherein the reaction is performed at a temperature range of 10° to 120° C. for a period of 0.15–24 hours.

14. A process as claimed in claim 12 wherein catalytic amount of LDH-diisopropylamide is used to perform the reaction.

15. A process as claimed in claim 12 wherein the LDH-diisopropylamide catalyst used provides 0.01 to 15 mole % of disopropylamide content with respect to substrate used in the reaction.

16. A process as claimed in claim 12 wherein the LDH-diisopropylamide catalyst is recovered by simple filtration and reused for several cycles with consistent reactivity and selectivity.

17. A process as claimed in claim 12 wherein the solvent used are selected from a group consisting of acetone, methanol, ethanol, dichloromethane, chloroform, 1-propanol, 2-propanol, toluene, nitromethane, acetonitrile and/or t-butanol.

18. A process as claimed in claim 12 wherein the various products formed are used as an important intermediates for the preparation of pharmaceutical drugs, perfumes, cosmetics, oils, paint and fine chemicals.

19. A process as claimed in claim 12 wherein the LDH-diisopropylamide catalyst is used for the first time to perform these various reactions.

20. A process as claimed in claim 12 in which there is at least an insignificant loss of active species, and the products are benign due to the preclusion of minor impurities from a side reaction resulting in no disposal problem and is thereby eco-friendly.

* * * * *